Dec. 2, 1930.  J. W. HOWELL  1,783,649
AXIAL PULLING TOOL
Filed March 8, 1928
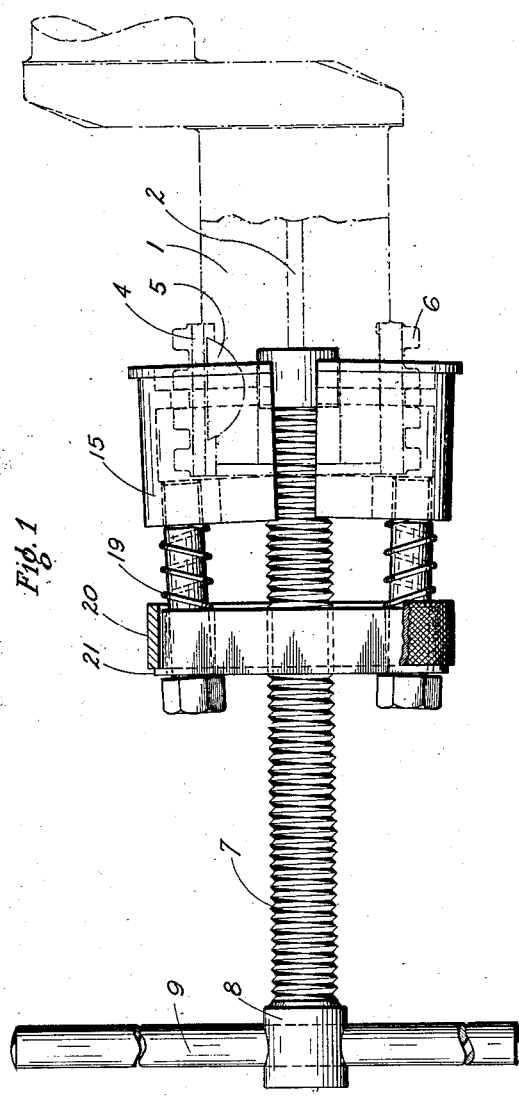
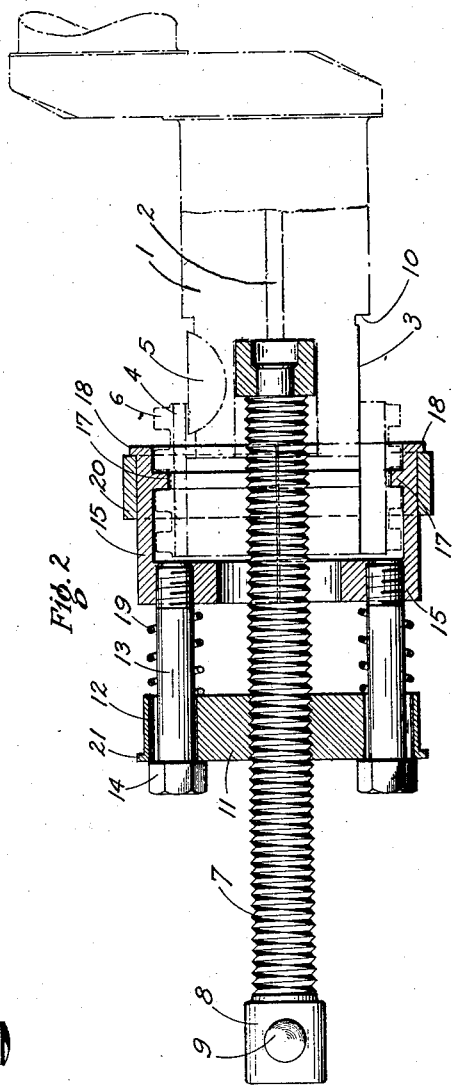
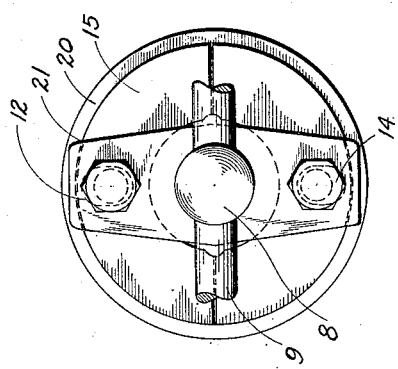
INVENTOR
James W. Howell
BY
Richey & Watts
ATTORNEYS Patented Dec. 2, 1930

1,783,649

UNITED STATES PATENT OFFICE

JAMES W. HOWELL, OF CLEVELAND, OHIO

AXIAL PULLING TOOL

Application filed March 8, 1928. Serial No. 259,948.

This invention relates to tools for removing objects axially from shafts and the like on which they may be mounted. It is particularly applicable to the removal of gears or sprockets, such as are used driving the chains which operate the timing mechanism of internal combustion motors, from the shafts upon which the sprockets are mounted.

An object of the invention is to provide a tool by which an axial force sufficient to remove a sprocket or the like from its shaft may be applied and which can be used in relatively small spaces.

Another object is to provide a tool which will remove sprockets or the like from their supporting shafts and which will prevent damage to the surface of the sprocket or to the end of the shaft.

Other objects will hereinafter appear.

The invention will be better understood from the description of one practical embodiment thereof, illustrated in the accompanying drawings, in which:

Figure 1 is a side elevation, parts broken away, showing the tool being applied to a sprocket such as is used for driving a "silent" chain;

Figure 2 is a longitudinal sectional view of the tool shown in Figure 1, with its parts in the position which they occupy while removing the sprocket; and Figure 3 is an end elevation of the tool in the position shown in Figure 2.

In the drawings the end of a motor crankshaft is illustrated at 1, the shaft being provided with a central oil duct 2 leading to a cylindrical recess 3 in the end of the shaft. A sprocket 4 is mounted on the end of the shaft and secured to rotate therewith by a Woodruff key 5. The sprocket is shown as provided with four spaced sets of teeth 6, disposed to engage the links of a chain for driving the timing gear of the motor or the like. During operation of the motor, other parts not shown are associated with the end of the shaft for receiving oil from the duct and for retaining the gear upon the end of the shaft, these, however, being removed, as is the chain driven by the sprocket, before the removal of the sprocket is attempted.

The tool itself comprises a pressure-exerting screw 7 for supplying the force necessary to remove the sprocket. The outer end of this screw is shown as having a cylindrical head 8 through which actuating bar or handle 9 extends. The inner end of the screw has swiveled thereto a cylindrical bearing piece or shoe 10 adapted to engage the shoulder at the inner end of the recess 3 in the shaft and to remain stationary with respect to the shaft while the end of the screw revolves within the shoe, thus preventing any abrasion of the shaft adjacent the end of the duct 2. Threaded upon the shaft is a transversely extending bar or yoke 11, the outer ends of which are provided with radially elongated perforations 12, through which extend screws 13, the heads 14 thereof bearing upon the outer surface of the yoke.

Threaded to the inwardly extending end of each screw is a hollow semi-cylindrical gripping member 15, provided on its inner surface with an inwardly extending flange 17 and on its outer edge with a projecting flange or stop 18.

Helical compression springs 19 surround the exposed portions of the screws 13 and press the semi-cylindrical gripping members away from the yoke, retaining the screw heads in contact with the outer surface of the latter. A securing ring 20 is slidable over the two gripping sections when these are brought close together and retains them in this position, the outer surface of the rings being knurled to provide a better hold for the operator. Projecting stops 21 on the ends of the yoke prevent the ring from sliding off the same while the tool is being applied to the sprocket.

The operation of the tool is as follows:

The gripping members are separated, as illustrated in Figure 1, there being sufficient clearance in slot 12 to permit the angular movement of screws 13 for this purpose. These members are then slipped over the sprocket until the flanges 17 may be slid into the space between the teeth of the sprocket, when the halves are moved together into the position shown in Figure 2 and the securing ring is slipped over them into engagement with the stops 18, retaining the flanges 17 in contact with and between the teeth of the sprocket so that longitudinal pressure may be transmitted thereto to remove it from the shaft. The pressure-exerting screw is then rotated by means of the handle and the pressure so produced draws the sprocket from the shaft, this being done without any scraping of either the teeth of the sprocket or the end of the shaft, while the connection between the tool and the sprocket is easily effected and is positive and capable of transmitting great pressure thereto.

It will be noted that the gripping members need extend beyond the teeth of the sprocket only by the distance from the inner edge of the flange 17 to the outer edge of stops 18 and the tool may therefore be applied to the sprockets even when there is relatively little space about the same.

While I have described the illustrated embodiment of my invention in some particularity, obviously many variations and modifications thereof will readily occur to those skilled in the art to which this appertains, and I do not, therefore, limit myself to the precise details shown and described, but claim as my invention all embodiments coming within the scope of the appended claims.

I claim:

1. A tool for removing articles axially from shafts which comprises a longitudinally split cylinder adapted to surround a part of an article to be removed, each sector of the cylinder being provided with an inwardly directed flange for engaging projections on the article, a continuous ring slidable on to the exterior surface of said cylinder to retain the halves thereof closely together, longitudinal-pressure-exerting means extendable into the hollow of said cylinder to engage the end of the shaft, a transverse member carried by said pressure-exerting means and longitudinally spaced from said split cylinder, and tension-transmitting connections between said transverse member and each of said segments.

2. A tool for removing an article from a shaft which comprises two semi-cylindrical, hollow, article-engaging members provided on their interiors with inwardly extending flanges for engaging projections on the article, a continuous ring slidable over the exterior of the members to retain them together upon the article, a connecting member extending axially outwardly from each article engaging member, a yoke axially spaced from said article-engaging members for exerting pressure upon the ends of said connecting members, and a pressure-exerting screw threaded through the yoke for applying axial pressure upon the end of the shaft.

3. A tool for removing an article axially from a shaft which comprises two semi-cylindrical gripping members adapted to surround a portion of an article to be removed, an inwardly extending flange on the interior surface of each gripping member to engage projections on the article, an outwardly extending stop on each gripping member, a continuous ring movable to surround the gripping members and to retain them in gripping position upon the article, the stop preventing the ring from slipping beyond the gripping members, a headed screw threaded into each gripping member, a yoke having radially elongated perforations through which the screws extend and upon the outer surface of which the screw heads abut, the yoke being provided with an outward surface adapted to retain the ring when the sections are not engaging an object and with stops to prevent the ring from sliding beyond the same, compression springs surrounding the screws and maintaining the gripping members and yoke apart, a longitudinal pressure-exerting screw threaded through the yoke and extendable within the space within the gripping members, and a swivelled contact-shoe for engaging the end of a shaft carried by the end of the longitudinal pressure exerting screw.

In testimony whereof I hereunto affix my signature this 5th day of March, 1928.

JAMES W. HOWELL.